United States Patent
Youn

(10) Patent No.: US 8,393,145 B2
(45) Date of Patent: Mar. 12, 2013

(54) EXHAUST GAS POST PROCESSING METHOD AND SYSTEM

(75) Inventor: Youngkee Youn, Seoul (KR)

(73) Assignee: Hyundai Motor Company, Seoul (KR)

( * ) Notice: Subject to any disclaimer, the term of this patent is extended or adjusted under 35 U.S.C. 154(b) by 344 days.

(21) Appl. No.: 12/941,764

(22) Filed: Nov. 8, 2010

(65) Prior Publication Data

US 2012/0047876 A1 Mar. 1, 2012

(30) Foreign Application Priority Data

Sep. 1, 2010 (KR) ................. 10-2010-0085678

(51) Int. Cl.
*F01N 3/00* (2006.01)
(52) U.S. Cl. ............. 60/295; 60/274; 60/286; 60/311
(58) Field of Classification Search ........... 60/274–324
See application file for complete search history.

(56) References Cited

U.S. PATENT DOCUMENTS

| | | | |
|---|---|---|---|
| 6,916,450 B2 * | 7/2005 | Akama et al. ............. | 422/180 |
| 7,506,503 B2 * | 3/2009 | Liimatta et al. ............ | 60/297 |
| 8,037,676 B2 * | 10/2011 | Gabe et al. ............... | 60/295 |
| 2003/0131592 A1 * | 7/2003 | Saito et al. ............... | 60/295 |
| 2006/0266023 A1 * | 11/2006 | Boegner et al. ............ | 60/297 |

FOREIGN PATENT DOCUMENTS

| JP | 2004-211650 A | 7/2004 |
|---|---|---|
| JP | 2007-138866 A | 6/2007 |

\* cited by examiner

*Primary Examiner* — Thomas Denion
*Assistant Examiner* — Jesse Bogue
(74) *Attorney, Agent, or Firm* — Morgan, Lewis & Bockius LLP

(57) ABSTRACT

An exhaust gas post processing method may include regenerating a diesel particulate filter, reducing a part remaining in the diesel particulate filter by raising the concentration of a reducing agent included in the exhaust gas after the regeneration, oxidizing a part remaining in the diesel particulate filter by raising the concentration of oxygen included in the exhaust gas after the regeneration, and calculating a real ash amount trapped in the diesel particulate filter by detecting a front/rear pressure difference of the diesel particulate filter after the reducing and the oxidation. Accordingly, after regenerating the diesel particulate filter, impurities are sequentially eliminated in the reducing condition and the oxidation condition, and ultimately the real ash amount can be accurately estimated. Further, based on the accurate ash amount, the particulate matter amount can be accurately predicted.

4 Claims, 2 Drawing Sheets

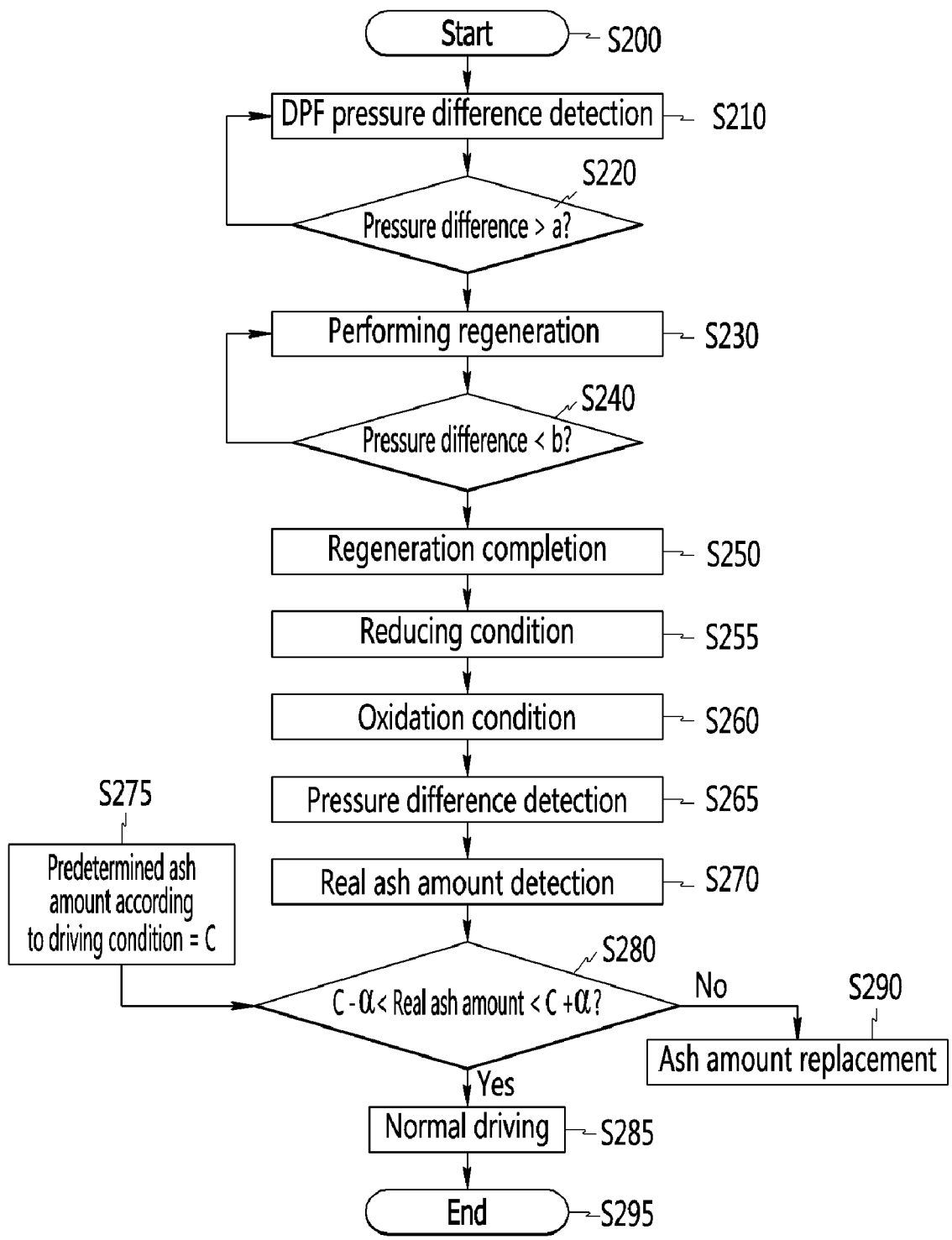

EXHAUST GAS POST PROCESSING METHOD AND SYSTEM

CROSS-REFERENCE TO RELATED APPLICATION

This application claims priority to and the benefit of Korean Patent Application No. 10-2010-0085678 filed in the Korean Intellectual Property Office on Sep. 1, 2010, the entire contents of which application is incorporated herein for all purposes by this reference.

BACKGROUND OF THE INVENTION

1. Field of the Invention

The present invention relates to an exhaust gas post processing method and system. More particularly, the present invention relates to an exhaust gas post processing method for trapping particulate matter included in an exhaust gas and eliminating it, and a system performing the method.

2. Description of the Related Art

Reducing harmful matter is an important problem in a diesel automobile that generates a large amount of harmful exhaust gas. Particularly, it is necessary to reduce PM (particulate matter) caused by incomplete combustion of a fuel.

A variety of techniques have been introduced to reduce the PM, and among them there is a DPF (diesel particulate filter) for trapping the PM of the exhaust gas and raising the temperature of the trapped PM to a temperature higher than the ignition point thereof to be eliminated.

Soot particles like carbon are trapped in the diesel particulate filter, the trapped PM is combusted, but the unburned remainder is not eliminated but is deposited within the DPF.

The deposited matter that is not burned is called "ash", and it becomes important to precisely estimate the ash amount and to detect the PM amount based on the ash amount.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention has been made in an effort to provide an exhaust gas post processing method having advantages of estimating a remaining ash amount within a diesel particulate filter.

Various aspects of the present invention may include regenerating a diesel particulate filter, reducing a part remaining in the diesel particulate filter by raising the concentration of a reducing agent included in the exhaust gas after the regeneration, oxidizing a part remaining in the diesel particulate filter by raising the concentration of oxygen included in the exhaust gas after the regeneration, and calculating a real ash amount trapped in the diesel particulate filter by detecting a front/rear pressure difference of the diesel particulate filter after the reducing and the oxidation.

The ash may be material that is not eliminated by the regeneration, the reducing, and the oxidation processes, and may include at least one material selected from SO3, MgO, ZnO, CaO, Fe2O3, and P2O5.

The exhaust gas post processing method may further includes selecting a predetermined ash amount trapped in the diesel particulate filter according to an accumulated fuel consumption amount, and changing the predetermined ash amount to the real ash amount if the difference between the real ash amount and the predetermined ash amount is larger than a predetermined value.

An exhaust gas post processing system according to various aspects of the present invention may include a diesel particulate filter that is configured to trap particulate matter included in the exhaust gas, and a control portion that is programmed to perform predetermined programs so as to eliminate the particulate matter trapped in the diesel particulate filter according to a driving condition, wherein the predetermined programs include an instruction to perform one of the exhaust gas post processing methods.

As stated above, after regenerating the diesel particulate filter, impurities are sequentially eliminated in the reducing condition and the oxidation condition, and ultimately the real ash amount can be accurately estimated in the exhaust gas post processing method according to various aspects of the present invention.

Further, based on the accurate ash amount, the particulate matter amount can be accurately predicted.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is a flowchart showing a method of an exemplary exhaust gas post processing according to the present invention.

DETAILED DESCRIPTION

Figure 1:
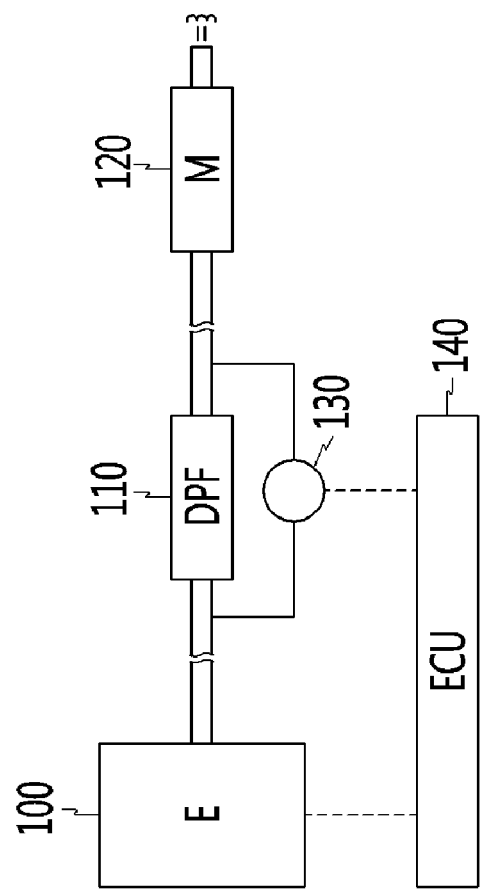
FIG. 1 is a schematic diagram of an exemplary exhaust gas post processing system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Referring to FIG. 1, an exhaust gas post processing system includes an engine 100, a diesel particulate filter 110, a muffler 120, a pressure difference sensor 130, and a control portion 140.

The diesel particulate filter 110 filters particulate matter included in the exhaust gas, and a front/rear pressure difference is formed by the filtered particulate matter.

The pressure difference sensor 130 detects the front pressure and the rear pressure of the diesel particulate filter 110, and transfers the detected signals the control portion 140 that calculates the pressure difference between them.

The control portion 140 uses the detected signals from the pressure difference sensor 130 to calculate the amount of particulate matter trapped in the diesel particulate filter 110, and if the amount exceeds a predetermined value, the control portion 140 raises the temperature of the exhaust gas to burn the trapped particulate matter.

The trapped materials within the diesel particulate filter 110 include soot (carbon particles) and a small amount of ash.

While the diesel particulate filter 110 is being regenerated, the soot can be burned to be eliminated, but almost all the ash remains, it is composed of $SO_3$, $MgO$, $ZnO$, $CaO$, $Fe_2O_3$, and $P_2O_5$, and it is necessary to eliminate the remaining ash.

Further, after the regeneration, an SOF (soluble organic fraction) and a sulfate mixed with moisture are factors raising the pressure difference. Thus, these materials are also to be eliminated.

After regenerating the diesel particulate filter 110, an ash cleaning process is performed so as to eliminate the ash and the like that are not eliminated from the diesel particulate filter 110 in various embodiments of the present invention.

The ash cleaning process includes a reducing condition that raises the fuel concentration included in the exhaust gas passing the diesel particulate filter 110, and an oxidization condition that raises the oxygen concentration included in the exhaust gas passing the diesel particulate filter 110.

As described above, the reducing condition and the oxidizing condition promote elimination of impurities of the ash within the diesel particulate filter 110 such that the pure ash amount can be detected.

After the ash cleaning process, the front/rear pressure difference of the diesel particulate filter 110 is used to detect the real ash amount.

In various embodiments of the present invention, a theoretical ash amount is set beforehand according to the consumed fuel amount, and the theoretical ash amount and the real ash amount are compared with each other.

The predetermined theoretical ash amount can be stored in a memory in the form of map data selected from many experiments, and the control portion can select the theoretical ash amount based on an operating time of the engine, a fuel consumption amount, and so on.

After the diesel particulate filter 110 is regenerated and the ash is cleaned in the reducing/oxidation condition, the real ash amount can be calculated from the detected front/rear pressure difference.

If the difference between the real ash amount and the predetermined theoretical ash amount exceeds a predetermined range, the control portion 140 changes the predetermined theoretical ash amount to the real ash amount, such that the real ash amount can be used as a control factor.

Referring to FIG. 2, an engine is started in step S200, the front/rear pressure difference of the diesel particulate filter 110 is detected in step S210, and it is determined whether the pressure difference exceeds a predetermined value (a) or not in step S220.

If the pressure difference exceeds the predetermined value (a), a fuel is additionally injected in step S230 so as to raise the temperature of the exhaust gas passing the diesel particulate filter 110. Further, if it is determined that the pressure difference is less than the predetermined value (b) in step S240, the regeneration is completed in step S250.

After the regeneration as stated above, the reducing condition is made by raising the amount of reducing agent in the exhaust gas supplied to the diesel particulate filter in step S255, and the oxidation condition is made by raising the amount of oxygen in the exhaust gas supplied to the diesel particulate filter in step S260.

As described above, the ash of the diesel particulate filter 110 is cleaned through the reducing condition and the oxidation condition, the impurities of the ash are eliminated by the reducing/oxidation condition, and ultimately pure ash remains.

After the ash cleaning process as stated above, the front/rear pressure difference of the diesel particulate filter 110 is detected in step S265, and the real ash amount is calculated based on the detected pressure difference in step S270.

The predetermined theoretical ash amount (C) is selected according to the consumed fuel amount or the travel distance of the engine 100 in step S275. The predetermined theoretical ash amount is included in map data stored in the memory beforehand.

The real ash amount and the predetermined theoretical ash amount are compared with each other in step S280. And, if the difference between the real ash amount and the predetermined theoretical ash amount exceeds a predetermined value (C), the predetermined theoretical ash amount is replaced with the real ash amount in step S290.

Further, if the difference between them is less than a predetermined value (C), the control is normally performed in step S285 and the control is completed in step S295.

The control portion 140 includes at least one microprocessor operating predetermined programs, and the predetermined programs include a series of instructions for performing the exhaust gas post processing method according to various embodiments of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An exhaust gas post processing method, comprising:
   regenerating a diesel particulate filter;
   reducing a first remainder of pollutants in the diesel particulate filter by raising the concentration of a reducing agent included in the exhaust gas after the regeneration;
   oxidizing a second remainder of pollutants in the diesel particulate filter by raising the concentration of oxygen included in the exhaust gas after the regeneration; and
   calculating a real ash amount trapped in the diesel particulate filter by detecting a front/rear pressure difference of the diesel particulate filter after the reducing and the oxidation.

2. The exhaust gas post processing method of claim 1, wherein the ash is material that is not eliminated by the regeneration, the reducing, and the oxidation processes, and includes at least one material selected from $SO_3$, $MgO$, $ZnO$, $CaO$, $Fe_2O_3$, and $P_2O_5$.

3. The exhaust gas post processing method of claim 2, further comprising:
   selecting a predetermined ash amount trapped in the diesel particulate filter according to an accumulated fuel consumption amount; and
   changing the predetermined ash amount to the real ash amount if the difference between the real ash amount and the predetermined ash amount is larger than a predetermined value.

4. An exhaust gas post processing system, comprising:
   a diesel particulate filter that is configured to trap particulate matter included in the exhaust gas; and a control portion that is programmed to perform predetermined programs so as to eliminate the particulate matter trapped in the diesel particulate filter according to a driving condition;

wherein the predetermined programs include an instruction to perform the method of claim 1.

* * * * *